United States Patent [19]
Groves

[11] Patent Number: 5,543,163
[45] Date of Patent: Aug. 6, 1996

[54] METHOD FOR ENHANCING THE FLAVOR AND SHELF LIFE OF FOOD PRODUCTS

[75] Inventor: Billy M. Groves, Pine Bluff, Ark.

[73] Assignee: Gajun, L.C., Pine Bluff, Ark.

[21] Appl. No.: 511,632

[22] Filed: Aug. 7, 1995

Related U.S. Application Data

[63] Continuation of Ser. No. 228,029, Apr. 15, 1994, abandoned.

[51] Int. Cl.$^6$ ............................. A23L 1/31; A23L 1/314
[52] U.S. Cl. ......................... 426/231; 426/232; 426/281; 426/641
[58] Field of Search ..................................... 426/231, 232, 426/233, 281, 641, 519, 265, 266

[56] References Cited

U.S. PATENT DOCUMENTS

| | | |
|---|---|---|
| 1,198,174 | 9/1916 | Waldron . |
| 2,140,781 | 12/1938 | Allen . |
| 2,739,899 | 3/1956 | Hollenbeck .............................. 426/265 |
| 2,788,281 | 4/1957 | Guadagni . |
| 2,928,740 | 3/1960 | Rosenthal et al. . |
| 2,987,404 | 6/1961 | Beckmann . |
| 3,099,566 | 7/1963 | Flesch et al. ............................ 426/266 |
| 3,139,347 | 6/1964 | Sair et al. ................................ 426/281 |
| 3,166,423 | 1/1965 | Sleeth et al. . |
| 3,177,080 | 4/1965 | Alberts .................................... 426/233 |
| 3,240,612 | 3/1966 | Wolnak .................................... 426/266 |
| 3,370,959 | 2/1968 | Moore et al. ............................ 426/281 |
| 3,476,569 | 11/1969 | McCarthy et al. . |
| 3,666,488 | 5/1972 | Nakao et al. ............................ 426/266 |
| 3,734,741 | 5/1973 | Larsen .................................... 426/231 |
| 3,806,612 | 4/1974 | Satz et al. ............................... 426/302 |
| 4,029,824 | 6/1977 | Langen .................................... 426/281 |
| 4,038,426 | 7/1977 | Jespersen et al. ...................... 426/641 |
| 4,136,204 | 1/1979 | Hughes et al. .......................... 426/261 |
| 4,214,518 | 7/1980 | Petsche . |
| 4,356,762 | 11/1982 | Langen . |
| 4,361,586 | 11/1982 | Meinke ...................................... 426/7 |
| 4,419,370 | 12/1983 | Yamamoto ................................. 426/7 |
| 4,517,888 | 5/1985 | Gould . |
| 4,818,548 | 4/1989 | Cheng ...................................... 426/265 |
| 4,937,092 | 6/1990 | Brotsky et al. ......................... 426/643 |
| 5,213,833 | 5/1993 | Yamada et al. .......................... 426/542 |
| 5,307,737 | 5/1994 | Higashimoto . |
| 5,323,694 | 6/1994 | Higashimoto . |

FOREIGN PATENT DOCUMENTS

| | | | |
|---|---|---|---|
| 2615003 | 11/1977 | Germany ................................. 426/281 |
| 566550 | 7/1977 | U.S.S.R. ................................. 426/281 |
| 8103547 | 12/1981 | WIPO ....................................... 426/231 |

OTHER PUBLICATIONS

"Vacuum Massaging: a Basic Approach", Meat Processing Feb. 1982.

Primary Examiner—Arthur L. Corbin
Attorney, Agent, or Firm—Baker & Botts, L.L.P.

[57] ABSTRACT

A processor (10) for processing food products, including those derived from animals such as catfish (12), includes a perforator (20) for perforating the membranes of the animal products. Fillets (22) are weighed by a scale (24) and analyzed for fat content by an analyzer (26). A vacuum tumbler (32) exposes the fillets (22) to both a partial vacuum created by vacuum source (44) and a hypotonic saline processing solution (48) partially filling the cylindrical drum (34) of the vacuum tumbler (32). A computer (28) provides central control of the processor (10). Processed fillets (50) may be weighed and analyzed for fat content, and then sorted and packaged for delivery. A sequence of process steps performed by the processor (10) may include feedforward lines (120) or feedback lines (126) to prepare the vacuum tumbler (32) for processing or to initiate a retumble. The processing solution (48) may also be a hypotonic saline solution with selected amounts of an organic acid, such as ascorbic acid, and yeast.

20 Claims, 2 Drawing Sheets

METHOD FOR ENHANCING THE FLAVOR AND SHELF LIFE OF FOOD PRODUCTS

CROSS REFERENCE TO RELATED APPLICATIONS

This application is a continuation of application Ser. No. 08/228,029 filed Apr. 15, 1994, entitled "Method and Apparatus for Enhancing the Flavor and Shelf Life of Food Products," by Billy M. Groves, now abandoned.

TECHNICAL FIELD OF THE INVENTION

This invention relates to processing food products generally and animal products specifically. This invention is more particularly directed to a method and apparatus for enhancing the flavor and shelf life of food products.

BACKGROUND OF THE INVENTION

The food processing industry is continually developing new approaches to preparing food products and particularly food items derived from animal products for human consumption. Generally, these approaches attempt to improve the overall consistency and quality of food products delivered to the consumer. In particular, food processors adopt various methods and systems to improve the flavor, shelf life, appearance, and nutrition of food products.

One approach to processing food products, and animal products in particular, places the animal product in a tumbler filled with a saline solution. The ham processing industry uses a tumbler to dramatically increase the water content of ham, sometimes as much as one hundred percent from its pre-tumbling weight. Another approach utilizes a tumbler partially evacuated and filled with a saline solution for alternately exposing the animal products to the saline solution and partial vacuum. The hydration achieved using a vacuum tumbler is significantly lower than the hydration achieved when processing hams using a conventional tumbler.

Overall consistency and quality of certain fish products may be improved dramatically by similar food preparation processes. In particular, the processing of catfish in a tumbler may result in a reduction in the "off-flavor" problem that historically has limited the expansion of the cultured catfish industry. It is estimated that ten percent of any harvest of "good" catfish is off-flavor. During the late summer as much as eighty percent of the available pond product is sufficiently off-flavor to interfere with commercial use. At least one source of the off-flavor in catfish tissue is geosmin ($C_{12}H_{22}O$), which is a volatile alcohol deposited by the metabolic process of the fish in the lipid fraction of the body. Several previous approaches, including tumbling and vacuum tumbling, have attempted to remove geosmin from catfish tissue to enhance flavor, reduce the overall fat content of the fish, and improve its shelf life.

Previous processing systems have experienced some limited success in enhancing the overall quality and consistency of animal products. These previous approaches, however, have not adequately identified and extracted the major components leading to low quality animal products and bacterial contamination. Furthermore, specific approaches in the catfish industry have not sufficiently solved the off-flavor problem of cultured catfish, especially the off-flavor present in larger and higher fat content fish caught during the late summer. The disadvantages of prior methods and systems for processing animal products have severely impaired the expansion of the cultured catfish industry.

SUMMARY OF THE INVENTION

In accordance with the present invention, the disadvantages and problems associated with previous methods and systems for processing food products, and in particular animal products, have been substantially reduced. The present invention improves on previous approaches by perforating the tissue of the animal products before vacuum tumbling. In addition, the present invention utilizes: (i) a hypotonic saline solution to enhance osmosis into the cellular structure, (ii) an organic acid additive to neutralize the chemicals associated with the off-flavor problem, and (iii) a yeast product to enhance the flavor of the animal product.

In one embodiment of the present invention a method for enhancing the flavor of animal products includes perforating the membranes of the animal products. The animal products are loaded into a vacuum tumbler and the vacuum tumbler is filled to a predetermined level with a processing solution. Air from the tumbler is withdrawn to create a partial vacuum. The tumbler is rotated for a predetermined time to expose the animal products to the processing solution and the partial vacuum. The animal products are removed from the tumbler after the predetermined time and packaged.

In accordance with another aspect of the present invention, a system for enhancing the flavor of animal products includes a perforator for perforating the animal products. A vacuum tumbler is adapted to receive (i) the animal products and (ii) a fluid mixture including water and sodium chloride. A vacuum source connected to the tumbler creates a partial vacuum. A motor connected to the tumbler rotates the tumbler. Ribs, attached to an internal wall of the tumbler, extend substantially parallel to the axis of rotation of the tumbler. The ribs support the animal products and expose the animal products to the fluid mixture and the partial vacuum as the tumbler rotates.

In accordance with another aspect of the present invention, a solution for processing animal products in a vacuum tumbler includes: (i) water in an amount approximately equal by weight to the animal products, (ii) sodium chloride in an amount no more than 0.9 percent of the weight of the animal products, (iii) an organic acid in an amount sufficient to adjust the pH of the solution to a value of less than 8.0 but preferably from 4.5 to 5.5, and (iv) yeast in an amount of approximately 0.1 percent of the weight of the animal products.

One technical advantage of the present invention includes enhanced appearance and taste of the processed animal products. The present invention enhances taste of the animal products by removing chemicals contributing to the off-flavor problem. The combination of perforating and vacuum tumbling in a processing solution also produces animal products with a fresher appearance and a more pleasant odor.

Another important technical advantage of the present invention is a reduction in total fat content of the processed animal products. Together with the extraction of chemicals contributing to the off-flavor problem, the same mechanism also reduces the fat content of the animal products. The present invention also reduces cholesterol and triglycerides.

Another important technical advantage of the present invention is improved shelf life of the processed animal products. The processing promotes bacterial lysis which greatly diminishes the bacteria count in the animal products and improves its shelf life.

Another important technical advantage of the present invention includes perforating the membranes of the animal products to assure a more uniform and extensive exposure to the processing solution and partial vacuum. The perforations allow greater penetration of the processing solution to extract off-flavor chemicals, reduce the fat content, and lower the bacteria count without sacrificing the appearance and integrity of the cellular membrane.

Another important technical advantage of the present invention is a processing system including a vacuum tumbler and a variety of sensors under the central control of a computer. In particular, the motor and vacuum source of the vacuum tumbler may be controlled by a computer in response to data received from a scale for weighing the animal products and an analyzer for measuring the fat content of the animal products. The processing time, processing rate, vacuum level, and amount and composition of the processing solution may be adjusted based on measurements of the unprocessed or processed animal products.

BRIEF DESCRIPTION OF THE DRAWINGS

For a more complete understanding of the present invention, and for further features and advantages, reference is now made to the following description taken in conjunction with the accompanying drawings, in which.

DETAILED DESCRIPTION OF THE INVENTION

Figure 1:
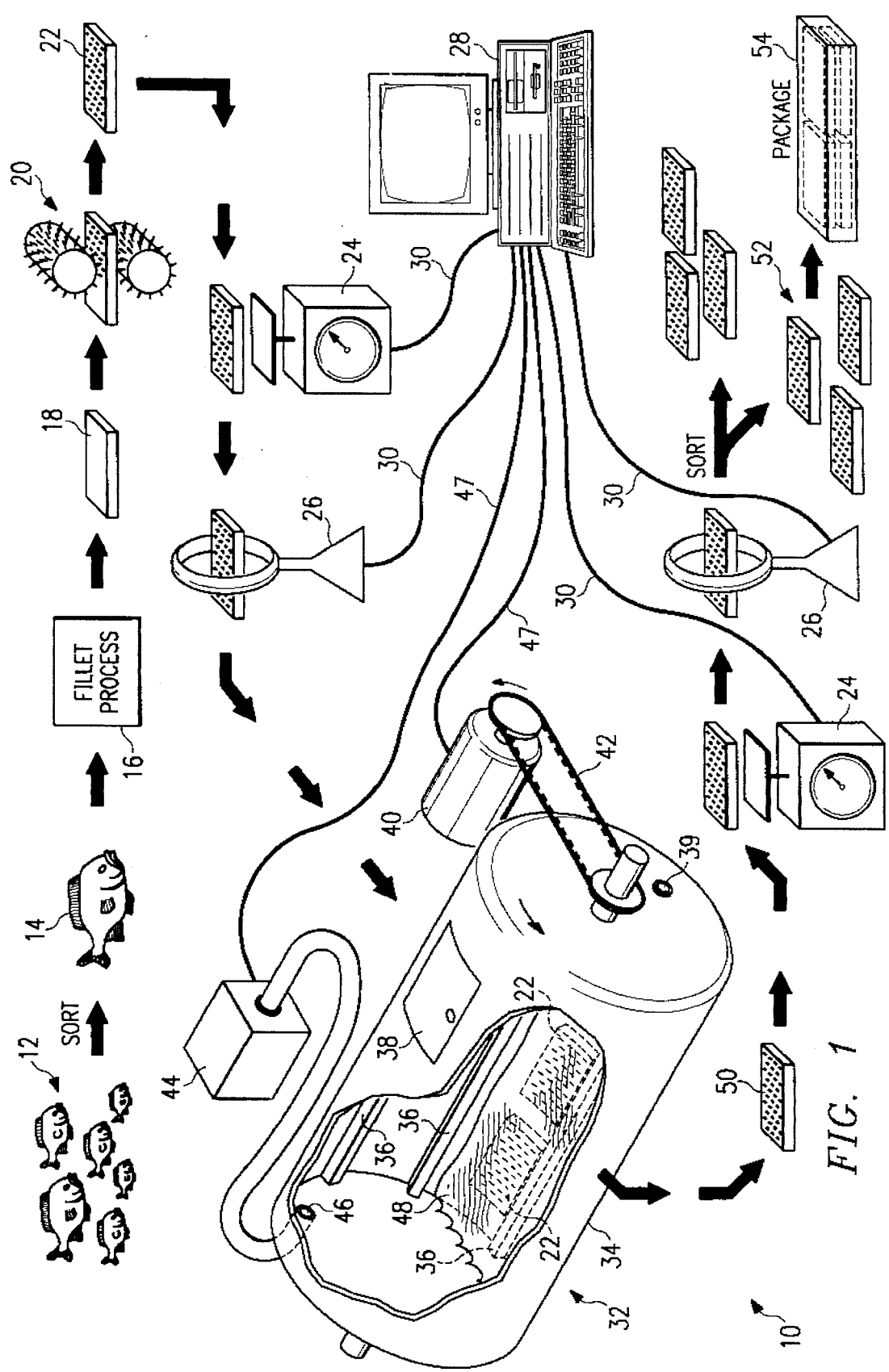
FIG. 1 illustrates the processing steps and components of an animal products processor constructed in accordance with the present invention.
Figure 2:
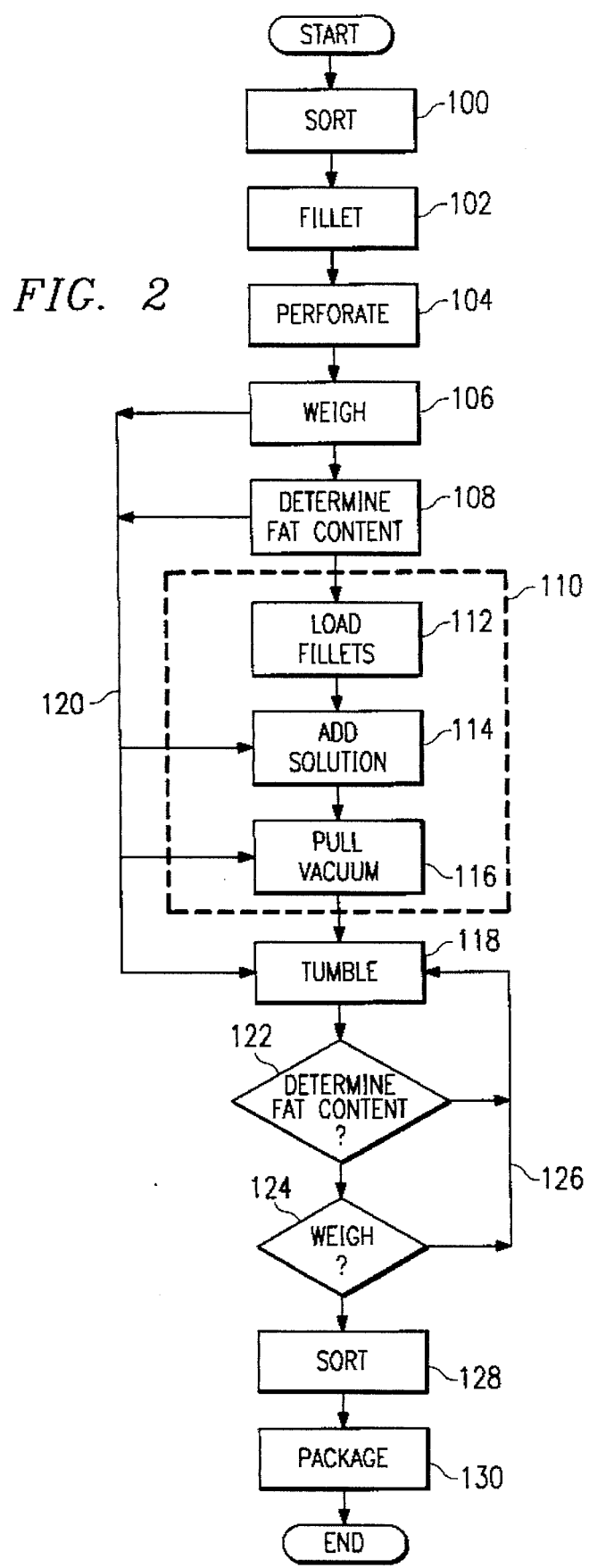
FIG. 2 is a flow diagram illustrating the sequence of process steps and information flow of the processor of FIG. 1.

The present invention and its advantages are best understood by referring to FIGS. 1 and 2 of the drawings, like numerals being used for like and corresponding parts of the various drawings.

The present invention contemplates a method for processing such food products as those derived from animal products and a system for carrying out the method. The present invention is described with reference to processing catfish, but other food products may be processed with minor variation and similar success. For example, the present invention has been used with success on shrimp, chicken, beef, and venison. Shrimp has been extensively processed with excellent improvement in flavor and complete cleaning of the "sand line" or "vein" typically found in shrimp. The present invention may also be extended to the processing of soy meal, since geosmin which contributes to the off-flavor problem in catfish is also known to cause the "earthy" smell in the soybean.

Now referring to the processing of catfish, it is believed that the present invention attacks the off-flavor problem in the catfish tissue by removing, among other materials, geosmin ($C_{12}H_{22}O$), the storage source of at least one chemical causing the persistent and unpleasant taste. Geosmin is a volatile alcohol deposited by the metabolic process of the fish in the lipid fraction of the body. The present invention uses several mechanical and chemical aspects to extract geosmin and remove other off-flavor materials in catfish.

One mechanical aspect of the present invention is vacuum tumbling, which enhances cleaning and exposes greater cellular membrane area to the extraction process. During vacuum tumbling, the catfish retains a desired percentage of the processing solution to improve overall appearance and taste. Vacuum tumbling also contributes to bacterial lysis which improves the shelf life of the catfish. Another mechanical aspect of the present invention is tissue perforation, especially of the membrane covering areas, which assures uniform and more extensive exposure of the catfish to vacuum processing.

Several chemical aspects of the present invention also enhance the quality and flavor of the catfish, and improve its shelf life. A hypotonic saline solution enhances osmosis into the cellular structure which contributes significantly to the dilution and extraction of the geosmin content. An organic acid additive, such as 1-glutamic or ascorbic acid, also decomposes the geosmin. The same organic acid additive or another chosen organic acid may also be used to re-establish the integrity of the cellular membrane. In addition, a yeast product may be added to enhance the tissue flavor.

It should be understood from the present invention that any combination of the mechanical and chemical aspects of the present invention may be used without departing from the scope of the invention. In one embodiment, the process produces a cleaner, whiter catfish with controlled hydration during the vacuum tumbling process. In addition to significantly reducing the off-flavor problem, the process also reduces total fat, cholesterol, and triglyceride content of the catfish, and prolongs shelf life through bacterial lysis. The several mechanical and chemical aspects of the present invention combine to produce catfish of superior quality and consistency.

FIG. 1 illustrates the process steps and components of processor 10. The operation of processor 10 will be described with reference to catfish, but it should be understood that processor 10 may be used successfully with any other appropriate food product. The process steps performed in processor 10 are shown in a particular order but may be performed in a different sequence without departing from the scope of the present invention. In addition, process steps may be performed at a single location or multiple locations.

Catfish 12 of varying sizes are caught and sorted based on size, appearance, or other appropriate characteristic to select sorted catfish 14 appropriate for processing by processor 10. Sorted catfish 14 are then de-headed, eviscerated, and de-boned by an automatic skinner-fillet machine 16. Skin, fins, and other similar material may be diverted for sale to the animal food preparation industry. The resulting fillet 18 from automatic skinner-fillet machine 16 is then ready for the various processing steps performed by processor 10. The following steps performed in processor 10 will be described with reference to a de-headed, de-boned, and eviscerated fillet, but it should be understood that the present invention contemplates processing animal products that include bones, internal organs, and other portions not intended for consumption.

The membranes of fillet 18 are perforated by perforator 20 to allow better tissue access during processing. Perforator 20 may be a single roller with perforating protrusions or a pair of rollers as shown in FIG. 1. Perforated fillet 22 is then weighed at scale 24 and analyzed for fat or lipid content by analyzer 26. Both scale 24 and analyzer 26 may transmit data regarding the weight and fat content of perforated fillet 22 to computer 28 over data collection lines 30. It should be understood that analyzer 26 may also be adapted to measure cholesterol, triglycerides, or any other monitored component of fillet 22.

Perforated fillets 22 are loaded into vacuum tumbler 32 for processing. Vacuum tumbler 32 comprises a cylindrical drum 34 mounted to rotate about a central axis. Affixed to the internal wall of cylindrical drum 34 are ribs 36 extending substantially parallel to the axis of rotation of cylindrical drum 34. Door 38 provides access to the inside of cylindrical drum 34, and drain 39 allows filling and draining of cylindrical drum 34 with processing solution 48, described below.

Motor 40 rotates cylindrical drum 34 either directly or through an appropriate transmission 42 using gears, pulleys, belts, or other appropriate members. It should be understood that the present invention contemplates any motor or engine 40 optionally coupled with an appropriate transmission 42 that can impart a rotational velocity to cylindrical drum 34. Vacuum source 44 is also connected to cylindrical drum 34 through vacuum source access port 46. Vacuum source 44 may be removable from vacuum source access port 46 to allow for free rotation of cylindrical drum 34. Vacuum source 44 operates to reduce the internal pressure of cylindrical drum 34. In one embodiment, vacuum source 44 reduces the internal pressure of cylindrical drum 34 by at least twenty five inches of mercury (Hg). The specific vacuum level may be adjusted based on the age and condition of the fish, as well as other factors. Both motor 40 and vacuum source 44 are connected to computer 28 through control lines 47.

Partially filling the inside of cylindrical drum 34 is processing solution 48. In one embodiment, processing solution 48 comprises: (i) water ($H_2O$) in an amount approximately equal by weight to fillets 22, and (ii) sodium chloride in an amount no more than 0.9 percent of the weight of fillets 22. To increase the osmotic absorption of processing solution into the membranes of fillets 22, a hypotonic saline solution of approximately 0.45 percent sodium chloride (NaCl) may be used. Although the amount of processing solution 48 should be approximately equal to the weight of fillets 22, the amount may vary without departing from the scope of the present invention.

An organic acid may also be added in an amount sufficient to adjust the pH of processing solution 48 to a value preferably from 4.5 to 5.5, but in any event less than 8.0. The organic acid may be 1-glutamic acid, ascorbic acid, or any other appropriate acid that may facilitate geosmin decomposition. Yeast may also be added to processing solution 48 in an amount of approximately 0.1 percent of the weight of fillets 22. The yeast is added to enhance the flavor of perforated fillets 22.

After loading perforated fillets 22 and processing solution 48, and after creating a partial vacuum within cylindrical drum 34 by vacuum source 44, cylindrical drum 34 is rotated by motor 40 at a predetermined rate and for a predetermined time. In one embodiment, cylindrical drum 34 is rotated at eight revolutions per minute for eight to twelve minutes. After the predetermined time for tumbling, the partial vacuum is released and fillets 22 may be drained, rinsed, and re-drained. The draining and rinsing steps (not shown) may be performed before or after removing fillets 22 from vacuum tumbler 32.

Processed fillets 50 may be weighed by scale 24 and analyzed for fat or lipid content by analyzer 26. As described above, analyzer 26 may be adapted to measure cholesterol, triglycerides, or other monitored component of processed fillets 50. Processed fillets 50 may weigh ten percent or more than unprocessed fillets 22 due to the hydration process during tumbling. Processed fillets 50 may contain significantly less fat, cholesterol, and triglycerides than unprocessed fillets 22 due to the decomposition and extraction process during tumbling.

Flash chromatography (not shown) may be used to analyze each processed fillet 50 for bacteria count. Processed fillets are then sorted, and sorted fillets 52 are placed in appropriate packaging 54. Packaging 54 may be either ice packing for fresh production or individual quick-freeze processed packing for frozen product packaging.

Computer 28 receives data from scale 24 and analyzer 26 over data collection lines 30. As depicted by the pair of scales 24 and the pair of analyzers 26 in FIG. 1, data may be collected on unprocessed fillets 22 or processed fillets 50. Computer 28 may then process this data and issue control signals to motor 40 and vacuum source 44 over control lines 47. Computer 28 further comprises a timer for determining elapsed time, a memory for storing data received from scale 24 and analyzer 26, and a control module for processing control signals to send to motor 40 and vacuum source 44 in response to stored data and elapsed time.

FIG. 2 is a flow diagram that illustrates the sequence of process steps performed by processor 10, including the information flow between computer 28, scale 24, analyzer 26, motor 40, and vacuum source 44. It should be understood from the present invention, that the process steps in FIG. 2 may be performed in various sequences without departing from the scope of the present invention.

Processing begins with a sort of the animal products to be processed at block 100. The animal products are filleted at block 102 and these fillets are perforated at block 104. The perforated fillets are then weighed at block 106 and their fat content determined at block 108.

The following group of steps designated by dashed block 110 prepares vacuum tumbler 32 of FIG. 1 for processing. The fillets are loaded into the vacuum tumbler at block 112 and the processing solution is added at block 114. The vacuum tumbler is then evacuated to create a partial vacuum at block 116. The vacuum tumbler, properly loaded and evacuated, is then rotated at a predetermined rate for a predetermined amount of time at block 118.

In one embodiment of the present invention, data generated at block 106 during weighing and block 108 during analyzing the fat content are fed forward to determine the amount and composition of processing solution added at block 114, the level of the partial vacuum created at block 116, and the predetermined rate and time to tumble the animal products performed at block 118. This operation indicates an open loop system where computer 28 receives data on unprocessed fillet 22 from scale 24 and analyzer 26 and controls motor 40 and vacuum source 44 in response to that data. The information flow of an open loop system for determining the operating characteristics of the vacuum tumbler are shown by feed-forward lines 120.

After tumbling for a predetermined amount of time at block 118, the process continues at block 122 where the fat content of processed fillets is determined. The processed fillets are also weighed at block 124. In another embodiment of the present invention, data determined at blocks 122 and 124 may be fed back over feedback lines 126 to initiate a re-tumble at block 118. A re-tumble may be based on fat content determined at block 122 or relative hydration indicated by weight determined at block 124. Fish fillets are then sorted at block 128 and packaged at block 130.

The present invention described with reference to FIGS. 1 and 2 has been used successfully to process catfish. Objective studies on the effect of the processing focus on two types of analysis. One analysis compares unprocessed catfish tissue to processed catfish tissue and indicates an increase in moisture content and reduced fat content due to the vacuum tumbling. A significant decrease in the fat content was measured for all varieties of catfish product. Another objective analysis indicates that the processing solution after tumbling contains significant amounts of fat, cholesterol, and triglycerides.

Although the present invention has been described with several embodiments, various changes and modifications may be suggested to one skilled in the art. In particular, the present invention was described with reference to catfish, but may apply to other animal products with little alteration and similar results. Furthermore, the present invention contemplates several process steps which may be performed in the sequence described, or in an alternative sequence without departing from the scope of the present invention. The present invention is intended to encompass such changes and modifications as fall within the scope of the appended claims.

What is claimed is:

1. A method for extracting off-flavor components from animal products, comprising:

perforating the membranes of animal products;

loading the animal products into a vacuum tumbler;

filling the tumbler to a predetermined level with a hypotonic saline solution, the hypotonic saline solution comprising water and sodium chloride in an amount no more than 0.9 percent of the weight of the water, the hypotonic saline solution being operable to enhance osmosis into the cellular structure of the animal products;

withdrawing air from the tumbler to create a partial vacuum;

rotating the tumbler for a predetermined time to expose the animal products to the hypotonic saline solution and the partial vacuum under conditions sufficient to extract off-flavor components from the animal products and to increase osmotic absorption of the solution into the membranes of the animal products;

removing the animal products from the tumbler after the predetermined time; and then packaging the animal products.

2. The method of claim 1, further comprising the step of measuring the fat content of the animal products prior to loading the animal products into the tumbler.

3. The method of claim 1, further comprising the step of measuring the fat content of the animal products after rotating the tumbler for the predetermined time.

4. The method of claim 1, further comprising the following steps performed prior to loading the animal products into the tumbler:

measuring the fat content of the animal products; and weighing the animal products.

5. The method of claim 1, further comprising the following steps performed after rotating the tumbler for the predetermined time:

measuring the fat content of the animal products; and weighing the animal products.

6. The method of claim 1, wherein the step of filling the tumbler to a predetermined level with a hypotonic saline solution comprises filling the tumbler with an amount of hypotonic saline solution approximately equal by weight to the animal products.

7. The method of claim 1, wherein the hypotonic saline solution further comprises an organic acid in an amount sufficient to adjust the pH of the solution to a value of less than 7.0.

8. The method of claim 1, wherein the step of withdrawing air from the tumbler to create a partial vacuum reduces the internal pressure of the tumbler by at least 25 inches of mercury.

9. The method of claim 1, further comprising the step of analyzing the animal products for bacteria after rotating the tumbler for the predetermined time.

10. The method of claim 1, wherein the animal products gain no more than fifteen percent by weight after rotating the tumbler for the predetermined time.

11. The method of claim 1, further comprising the step of rinsing the animal products after rotating the tumbler for the predetermined time.

12. A method for extracting off-flavor components from animal products, comprising:

loading animal products into a vacuum tumbler filled with a predetermined level of hypotonic saline solution, the hypotonic saline solution comprising water and sodium chloride in an amount no more than 0.9 percent of the weight of the water, the hypotonic saline solution being operable to enhance osmosis into the cellular structure of the animal products; and then rotating the tumbler for a predetermined time to expose the animal products to the hypotonic saline solution and to a partial vacuum under conditions sufficient to extract off-flavor components from the animal products and to increase osmotic absorption of the solution into the cellular structure of the animal products.

13. The method of claim 12, further comprising the step of perforating the membranes of the animal products before loading the animal products into the tumbler.

14. The method of claim 12, further comprising the step of withdrawing air from the tumbler to create a partial vacuum before rotating the tumbler for a predetermined time.

15. The method of claim 12, wherein the predetermined amount of hypotonic saline solution is approximately equal by weight to the weight of the animal products.

16. The method of claim 12, wherein the processing solution further comprises an organic acid in an amount sufficient to adjust the pH of the solution to a value of less than 7.0.

17. The method of claim 12, further comprising the step of measuring the fat content of the animal products prior to loading the animal products into the tumbler.

18. The method of claim 12, further comprising the step of measuring the fat content of the animal products after rotating the tumbler for a predetermined time.

19. The method of claim 12, further comprising the step of analyzing the animal products for bacteria after rotating the tumbler for a predetermined time.

20. The method of claim 12, wherein the animal products gain no more than fifteen percent by weight after rotating the tumbler for the predetermined time.

* * * * *